(12) United States Patent
Wang et al.

(10) Patent No.: US 9,839,089 B1
(45) Date of Patent: Dec. 5, 2017

(54) CONTROL METHOD FOR SMART LIGHT (71) Applicant: DXY Technology Co., Limited, Shenzhen (CN)

(72) Inventors: Jingxi Wang, Shenzhen (CN); Yaodong Su, Shenzhen (CN); Zengjie Cai, Shenzhen (CN)

(*) Notice: Subject to any disclaimer, the term of this patent is extended or adjusted under 35 U.S.C. 154(b) by 0 days.

(21) Appl. No.: 15/297,134

(22) Filed: Oct. 19, 2016

Related U.S. Application Data (63) Continuation of application No. PCT/CN2016/100049, filed on Sep. 26, 2016.

(30) Foreign Application Priority Data

Aug. 24, 2016 (CN) .......................... 2016 1 0712055

(51) Int. Cl.
*H05B 37/02* (2006.01)
*H05B 33/08* (2006.01)
*G06F 3/0484* (2013.01)
*G06F 3/0481* (2013.01)
*G06F 3/0483* (2013.01)

(52) U.S. Cl.
CPC ..... *H05B 33/0863* (2013.01); *H05B 33/0845* (2013.01); *H05B 37/0272* (2013.01); *G06F 3/0483* (2013.01); *G06F 3/04817* (2013.01); *G06F 3/04847* (2013.01)

(58) Field of Classification Search
CPC .......................... H05B 37/02; H05B 37/0218; H05B 37/0227; H05B 37/0245; H05B 37/0254; H05B 37/0272
USPC ........................................ 315/152, 307, 312
See application file for complete search history.

(56) References Cited

U.S. PATENT DOCUMENTS 7,498,952 B2 * 3/2009 Newman, Jr. .......... H01Q 7/005
307/139
8,035,320 B2 * 10/2011 Sibert ................ H05B 37/0245
315/149

(Continued)

*Primary Examiner* — Tung X Le
(74) *Attorney, Agent, or Firm* — Wayne & Ken, LLC; Tony Hom (57) ABSTRACT

The present invention provides a control method for a smart light, comprising:
displaying control information of connected smart lights as a first kind of icon and/or a second kind of icon on a main interface, the first kind of icon corresponds to a single light and the second kind of icon corresponds to a group consisting of at least two single lights;
when detecting at the position of the first kind of icon and the second kind of icon and identifying as selected operation, displaying a control interface corresponding to the single light or the group;
the control interface comprises a light-adjusting tab, the light-adjusting tab comprises a parameter adjustment column, a switch button and an effect simulation diagram;
when the light-adjusting tab is on active page, sending parameter configuration information to corresponding single light or group based on sliding position of detected slider in the parameter adjustment column, and
sending switch light configuration information to corresponding single light or group based on state change of detected switch button, and
displaying the effect simulation diagram based on the parameter configuration information and the switch light configuration information.

13 Claims, 9 Drawing Sheets

(56) References Cited

U.S. PATENT DOCUMENTS

| | | | | |
|---|---|---|---|---|
| 8,197,093 B2* | 6/2012 | Veskovic | .................. | E06B 9/32 |
| | | | | 250/214 AL |
| 8,368,310 B1* | 2/2013 | Roosli | ................ | H05B 37/0245 |
| | | | | 315/152 |
| 2012/0025717 A1* | 2/2012 | Klusmann | .......... | H05B 37/0218 |
| | | | | 315/152 |
| 2012/0242254 A1* | 9/2012 | Kim | ................... | H05B 37/0272 |
| | | | | 315/312 |
| 2013/0147366 A1* | 6/2013 | Huizenga | ............... | H05B 37/02 |
| | | | | 315/152 |

* cited by examiner

CONTROL METHOD FOR SMART LIGHT

CROSS-REFERENCE TO RELATED APPLICATIONS

This application is a continuation of International Patent Application No. PCT/CN2016/100049 with a filing date of Sep. 26, 2016, designating the United States, now pending, and further claims priority to Chinese Patent Application No. 201610712055.4 with a filing date of Aug. 24, 2016. The content of the aforementioned applications, including any intervening amendments thereto, are incorporated herein by reference.

TECHNICAL FIELD

The present invention relates to technical field of smart home, more particularly, to a control method for a smart light.

BACKGROUND OF THE PRESENT INVENTION

One mobile phone can merely control one light or limited multiple lights in existing smart light technologies, if other lights need to be controlled, the connecting light must be disconnected, the current APP interface must be exit, and the connection of other lights will be realized, which is trouble to operate.

Besides, the existing bluetooth technical scheme cannot realize group control, that is, multiple lights cannot be controlled simultaneously. The control of multiple lights can only be realized by connection one by one or simultaneous connection and time-sharing control, however, simultaneous connection and time-sharing control will result in delayed control. And if different lights need to be switched, the current light need to be disconnected, and the target control light need to be connected again.

However, after realization of group function, it will face a problem of light group information sharing, the existing bluetooth technical scheme does not take it into consideration, so data synchronism of light group in different mobile phones cannot be realized. If data is out of sync, other mobile phones cannot correctly and effectively control lights after grouping of some mobile phone.

SUMMARY OF PRESENT INVENTION

The purpose of the present invention is to provide a control method for a smart light against defects in existing technologies.

The present invention provides a control method for a smart light, comprising:
displaying control information of connected smart lights as a first kind of icon and/or a second kind of icon on a main interface, the first kind of icon corresponds to a single light and the second kind of icon corresponds to a group consisting of at least two single lights;
when detecting at the position of the first kind of icon and the second kind of icon and identifying as selected operation, displaying a control interface corresponding to the single light or the group;
the control interface comprises a light-adjusting tab, the light-adjusting tab comprises a parameter adjustment column, a switch button and an effect simulation diagram;
when the light-adjusting tab is on active page, sending parameter configuration information to corresponding single light or group based on sliding position of detected slider in the parameter adjustment column, and
sending switch light configuration information to corresponding single light or group based on state change of the detected switch button, and
displaying the effect simulation diagram based on the parameter configuration information and the switch light configuration information.

As a preferred scheme, the control interface also comprises a scene tab, the scene tab comprises at least a scene icon, and each scene icon corresponds to a group of pre-set scene parameter;
when the scene tab is on active page, sending the pre-set scene parameter to the single light or group based on detection and identification as selected scene icon, and realizing one-key setting to the single light or group.

As a preferred scheme, when displaying the control interface corresponding to the group, the pre-set scene parameter comprises parameter configuration information and switch light configuration information of all single light members contained in the group.

As a preferred scheme, the parameter configuration information comprises brightness configuration information and/or color temperature configuration information.

As a preferred scheme, the scene tab also comprises an add button, when detecting and identifying the add button is pressed, displaying a scene new page;
The scene new page comprises a parameter pre-set option of the single light or the group corresponding to the control interface, generating a group of new pre-set scene parameter based on the input of the parameter pre-set option of the single light or the group in the scene new page, adding a new scene icon in the scene tab, the new scene icon corresponds to the new pre-set scene parameter.

As a preferred scheme, the control interface also comprises a setting tab, the setting tab comprises an alarm clock setting and a single light name setting bar;
controlling time on/off of the single light or group based on input time of the alarm clock setting and alarm clock attribution;
displaying input information in the single light name setting bar as name of single light or single light members.

As a preferred scheme, when detecting and identifying as pre-set gesture operation, displaying a quick control interface, corresponding displaying connected single light and/or group as shrunken first kind of icon and/or second kind of icon on the quick control interface, and when group is provided, displaying single light members contained in the group as the first kind of icon;
When detecting at the position of the first kind of icon and the second kind of icon and identifying as selection on the quick control interface, switching to the control interface corresponding to the single light or the group.

As a preferred scheme, the pre-set gesture operation is identification information that touch point of pre-set quantities is detected and movement to pre-set direction exceeds pre-set distance.

As a preferred scheme, on the main interface, if long press is detected at the position of one first kind of icon, and it is dragged to the position of another first kind of icon, it is judged that two corresponding single lights are combined into a group; one second kind of icon is newly established to correspond to a new group, the new group comprises the two single lights.

As a preferred scheme, on the main interface, if long press is detected at the position of one first kind of icon, and it is dragged to the position of another first kind of icon, it is judged that the single light corresponding to the first kind of icon is added into the group corresponding to the second kind of icon.

As a preferred scheme, on the main interface, if long press is detected at the position of the second kind of icon, it is judged as group members deletion and group name editing, and displaying a group editing page, the group editing page comprises a group name editing column and single light members displayed as the first kind of icon, displaying a delete icon on the right corner of the first kind of icon corresponding to each single light member; when clicking the delete icon is detected, the corresponding single light member is deleted from the group; and saving the information of the group name editing column as name of the group.

As a preferred scheme, the main interface also comprises a share button, when detecting and judging the share button is clicked on the main interface, displaying a share page, the share page comprises a share light button and an acquiring light button;

When detecting and judging the share light button is clicked on the share page, real-time uploading the control information of all of parts of selected smart lights into a server;

When detecting and judging the acquiring light button is clicked on the share page, acquiring shared network name information, and synchronously acquiring shared control information of smart lights from the server based on the network name information.

As a preferred scheme, a hover button is preset, if click operation is detected on the hover button, sending full open or full closed switch light configuration information to all single lights and groups; if double click operation is detected on the hover button, displaying the quick control interface; if long press operation is detected on the hover button, locking or unlocking the position of the hover button; under the locking state of the position of the hover button, if sliding operation to a first pre-set direction is detected on the hover button, correspondingly adjusting the color temperature of the connected single light or group; if sliding operation to a second pre-set direction is detected on the hover button, correspondingly adjusting the brightness of the connected single light or group; under the unlocking state of the position of the hover button, if sliding operation is detected on the hover button, the display position of the hover button is changed with the displacement of sliding.

Compared with prior art, the present invention has following beneficial effects:

1. Existing scene settings can only set the current connected lights, multiple lights responding to scene settings cannot be user-defined, and these lights cannot have different configurations. However, the present invention can carry out user-defined settings to single light or combined scene of multiple lights, and realize different parameter settings to different lights.

2. Existing group function can only be added when light selection is carried out in multiple interfaces. The present invention can carry out new group and deletion of single light in group in a main interface, a group of multiple lights can realize uniform control of multiple single lights or one-key setting of multiple lights.

3. The problem existed in prior art that light group information is out of sync in different mobile phones is solved. The present invention realizes control information share of smart lights and information synchronization of multiple terminals by share page, and sharing the terminal which acquires the control information of smart lights can acquire shared operation situation of smart lights in real time by network.

4. In prior art, when light control needs to be switched, it needs to be connected again, and quick switch control cannot be realized. The present invention realizes quick switch control by the quick control interface, the quick control interface can be entered into by gesture to carry out lights selection and control.

5. The problem of delayed control when multiple lights are connected existed in prior art is solved. The present invention realized quick control of multiple lights through group uniform parameter configuration and scene setting.

DESCRIPTION OF THE DRAWINGS

For clearly explaining technical scheme of embodiments of the present invention, drawings described in embodiments are introduced briefly as follows, it is obvious that drawings described as follows are merely some embodiments of the present invention, other drawings can be acquired based on these drawings without creative labor for those skilled in the art. In these drawings.

DETAILED DESCRIPTION OF PREFERRED EMBODIMENTS

The present invention is further described in embodiments with reference to drawings. Following embodiments will help those skilled in the art further understand the present invention, however, the present invention is not limited in any form. It should be noted that other embodiments can be used, or the embodiments herein can be modified in structure and function without departing from the scope and substance of the present invention.

A control method for a smart phone provided by the embodiments of the present invention, comprising:

displaying control information of connected smart lights as a first kind of icon and/or a second kind of icon on a main interface, the first kind of icon corresponds to a single light and the second kind of icon corresponds to a group consisting of at least two single lights;

when detecting at the position of the first kind of icon and the second kind of icon and identifying as selected operation, displaying a control interface corresponding to the single light or the group;

the control interface comprises a light-adjusting tab, the light-adjusting tab comprises a parameter adjustment column, a switch button and an effect simulation diagram;

when the light-adjusting tab is on active page, sending parameter configuration information to corresponding single light or group based on sliding position of detected slider in the parameter adjustment column, and sending switch light configuration information to corresponding single light or group based on state change of the detected switch button, and displaying the effect simulation diagram based on the parameter configuration information and the switch light configuration information.

Figure 6:
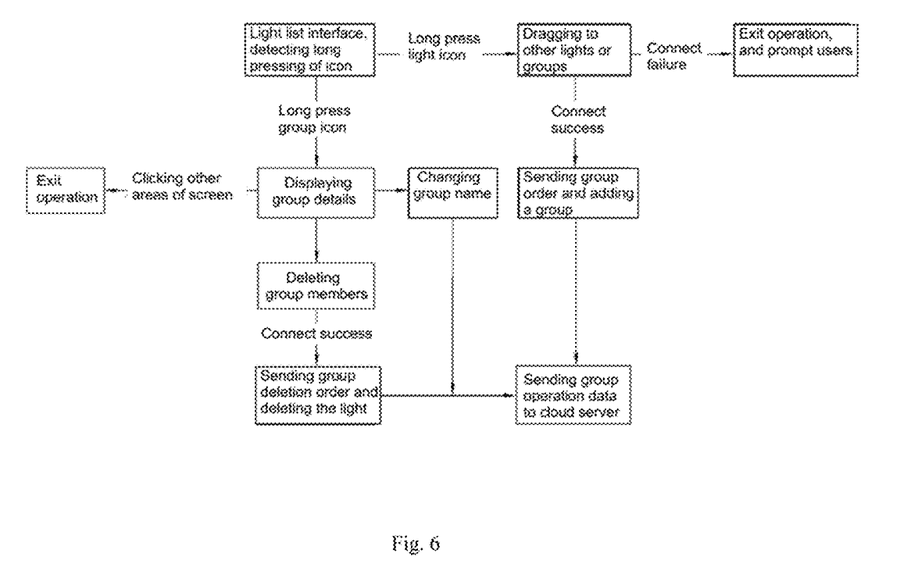
FIG. 6 is an optional operation flow diagram of group editing.

FIG. 6 is an operation flow diagram of group editing, the group or the single light can be edited on the main interface through operation of icon.

For detecting and identifying the position of the first kind of icon and the second kind of icon as selected operation, click, double click or other pre-set movements can be detected, the present invention is not limited thereto.

In the embodiment, uniform configuration of multiple lights is realized by uniform parameter configuration of grouped single light members, and time consuming problem of traditional control of multiple lights is avoided.

The switch button in the light-adjusting tab is arranged on a light icon of the effect simulation diagram, the light icon can be clicked to control light switch, or slider on the parameter adjusting column is slide to adjust light brightness or color temperature, meanwhile, light brightness and color temperature on the effect simulation diagram will be expressed by color change.

Figure 7:
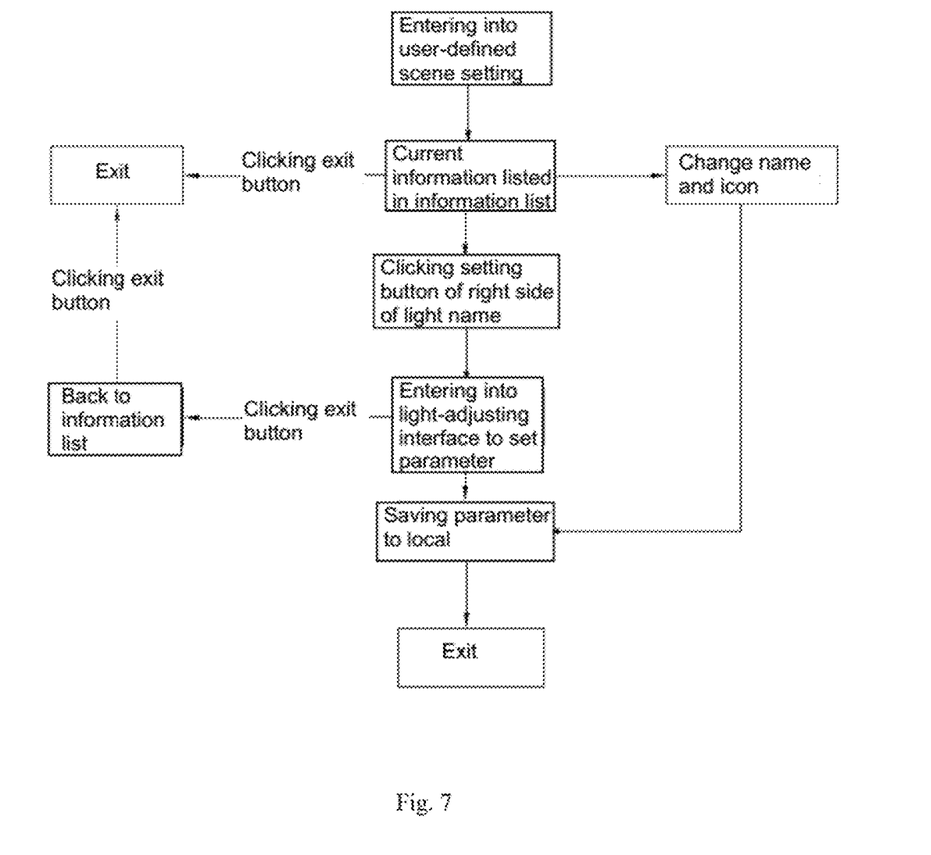
FIG. 7 is an optional operation flow diagram of scene setting.

As an optional embodiment, the control interface also comprises a scene tab, the scene tab comprises at least a scene icon, and each scene icon corresponds to a group of pre-set scene parameter;

When the scene tab is on active page, sending the pre-set scene parameter to the single light or group based on detection and identification as selected scene icon, and realizing one-key setting to the single light or group. FIG. 7 is an operation flow diagram of scene setting.

As an optional embodiment, when displaying the control interface corresponding to the group, the pre-set scene parameter comprises parameter configuration information and switch light configuration information of all single light members contained in the group.

As an optional embodiment, the parameter configuration information comprises brightness configuration information and/or color temperature configuration information.

As an optional embodiment, the scene tab also comprises an add button, when detecting and identifying the add button is pressed, displaying a scene new page;

the scene new page comprises a parameter pre-set option of the single light or the group corresponding to the control interface, generating a group of new pre-set scene parameter based on the input of the parameter pre-set option of the single light or the group in the scene new page, adding a new scene icon in the scene tab, the new scene icon corresponds to the new pre-set scene parameter.

As an optional embodiment, the control interface also comprises a setting tab, the setting tab comprises an alarm dock setting and a single light name setting bar;

controlling time on/off of the single light or group based on input time of the alarm dock setting and alarm clock attribution;

displaying input information in the single light name setting bar as name of single light or single light members.

Specific single light or group can be set as lighting and shutting down at specific time by setting the alarm clock setting, for example, controlling bedlight to lighten at 6 a.m can play an effect on waking sleep, and controlling lights of living room and compartment to shut down at 10 p.m and night light to turn on can play an effect on reminding sleep. Setting of alarm dock plays a significant role in modern living.

Figure 3:
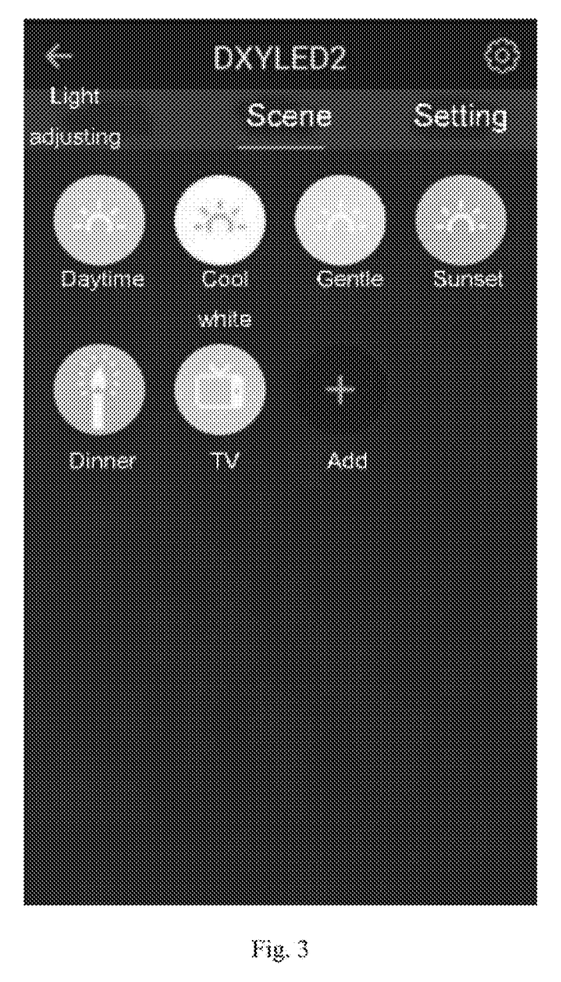
FIG. 3 is an optional embodiment of a scene tab display.

As FIG. 3 shown, five default scene modes are set in the embodiment, that is, daytime, cool white, gentle, sunset and dinner, users can adjust the controlled light or group to brightness and color temperature of corresponding mode by clicking corresponding icon. And users can click "add button" to add user-defined scene mode, which has no quantitative limitation. In user-defined scene mode, scene name and scene icon can be set, different brightness and color temperature of multiple single light members in a group can be set respectively to realize the function of one-key setting combined scene.

As an optional embodiment, when detecting and Identifying as pre-set gesture operation, displaying a quick control interface, corresponding displaying connected single light and/or group as shrunken first kind of icon and/or second kind of icon on the quick control interface, and when group is provided, displaying single light members contained in the group as the first kind of icon;

when detecting at the position of the first kind of icon and the second kind of icon and identifying as selection on the quick control interface, switching to the control interface corresponding to the single light or the group.

Figure 2:
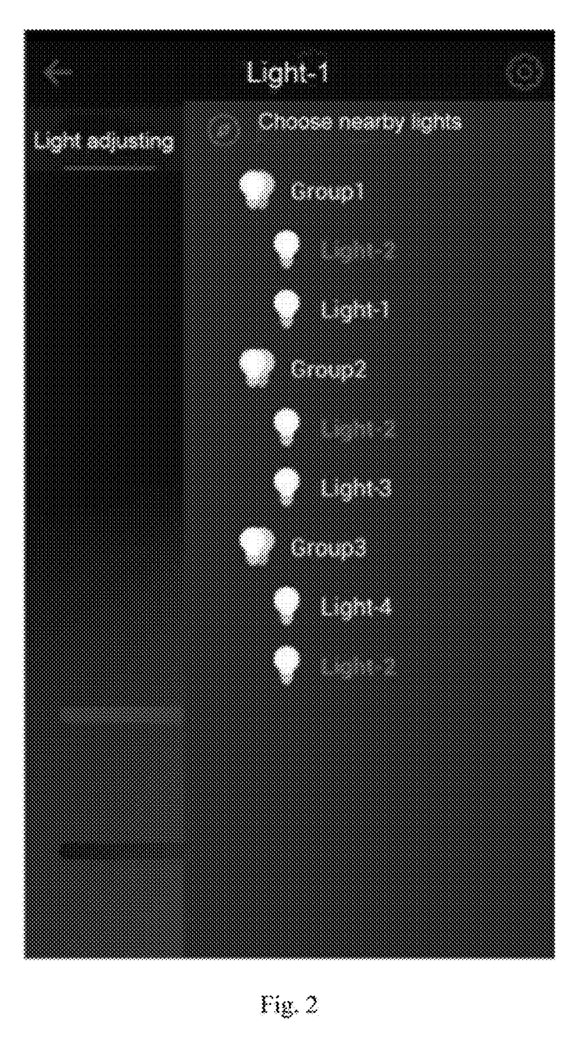
FIG. 2 is an optional quick control interface for a smart light.
Figure 8:
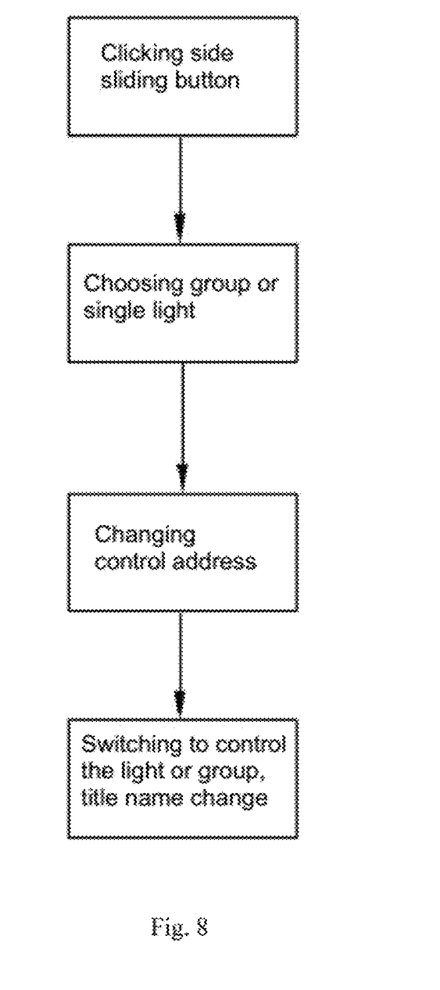
FIG. 8 is an optional operation flow diagram of side sliding.

As FIG. 2 and FIG. 8 shown, the quick control interface of smart lights can be displayed by side sliding. In the quick control interface, the existing group and lights of the group can be displayed, and lights scanned nearby can also be displayed, if scanned lights are not in the group, they will be displayed continually under the list. Lights of the group display different color based on whether it is contained by other groups, it is green if contained by two or more than two groups, it is white if contained by only one group, and it is yellow if not contained by any group. Users can click group or single light in this interface to directly switch control the group or light, light-adjusting tab is no need to be exit and scanned again to connect, which is convenient and quick.

As an optional embodiment, the pre-set gesture operation is identification information that touch point of pre-set quantities is detected and movement to pre-set direction exceeds pre-set distance.

As an optional embodiment, on the main interface, if long press is detected at the position of one first kind of icon, and it is dragged to the position of another first kind of icon, it is judged that two corresponding single lights are combined into a group; one second kind of icon is newly established to correspond to a new group, the new group comprises the two single lights.

As an optional embodiment, on the main interface, if long press is detected at the position of one first kind of icon, and it is dragged to the position of another first kind of icon, it is judged that the single light corresponding to the first kind of icon is added into the group corresponding to the second kind of icon.

As an optional embodiment, on the main interface, if long press is detected at the position of the second kind of icon, it is judged as group members deletion and group name editing, and displaying a group editing page, the group editing page comprises a group name editing column and single light members displayed as the first kind of icon, displaying a delete icon on the right corner of the first kind of icon corresponding to each single light member, when clicking the delete icon is detected, the corresponding single light member is deleted from the group; and saving the information of the group name editing column as name of the group.

Figure 1:
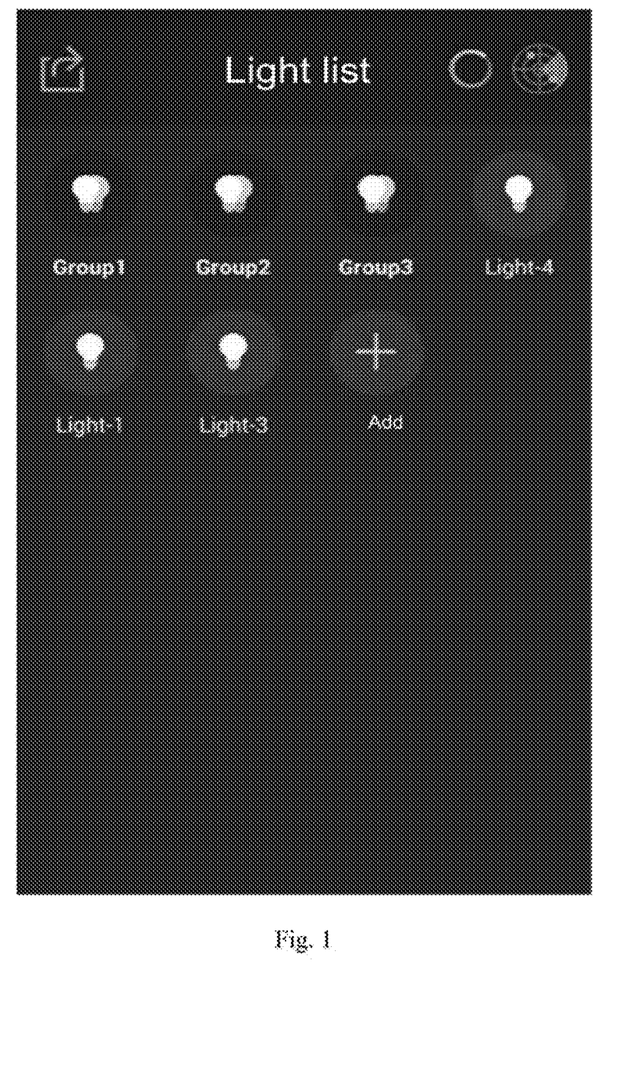
FIG. 1 is an optional embodiment of a main interface display.

As FIG. 1 shown, in the embodiment, smart light devices are displayed in the interface by way of icon, users can long press the first kind of icon and drag to another first kind of icon to form a new group. Other lights can be continually added to the group if they are continually dragged to the bluetooth light group. Long pressing the second kind of icon can display all single light members contained in a group, and group can be named or some single light members can be deleted. This operation mode enables the group to be simple, direct, convenient, and it is more close to operation habit of uses.

Figure 9:
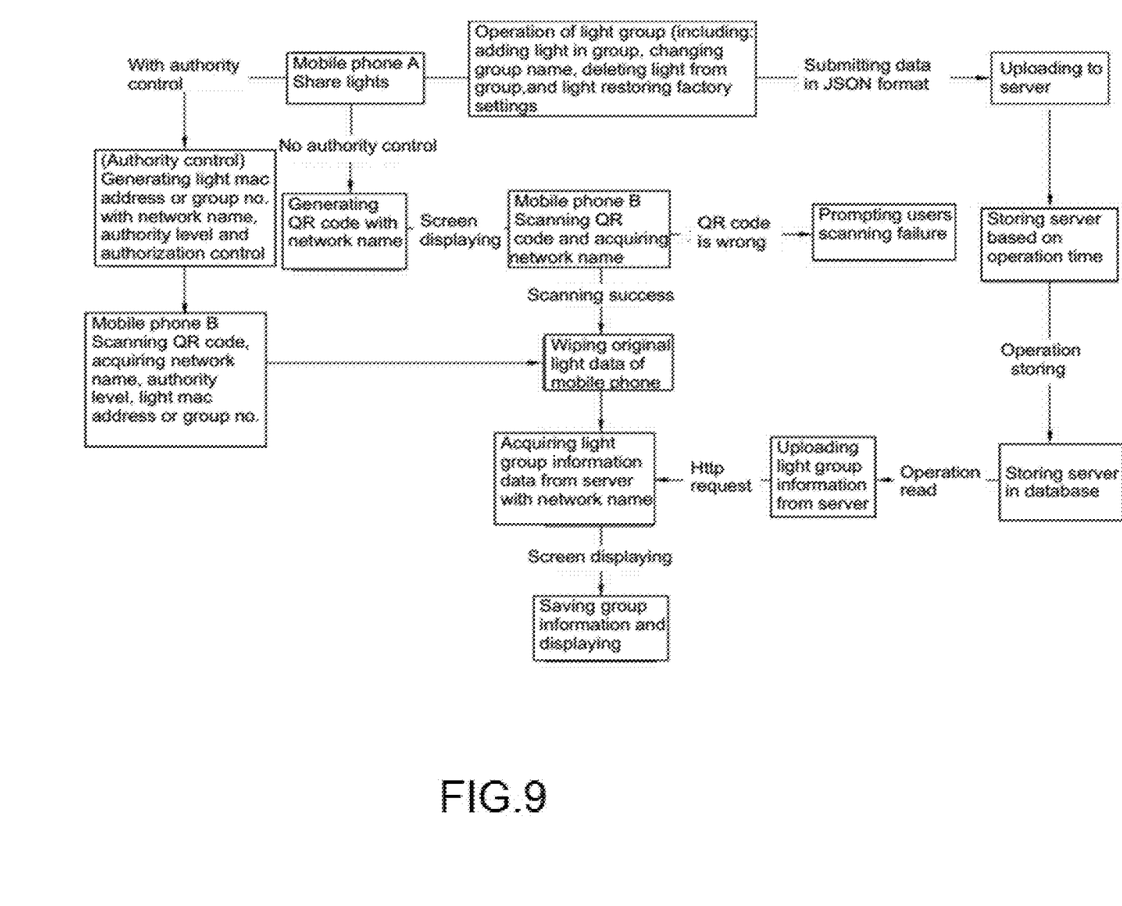
FIG. 9 is an optional operation flow diagram of a light share authority management.

As an optional embodiment, the main interface also comprises a share button, when detecting and judging the share button is clicked on the main interface, displaying a share page, the share page comprises a share light button and an acquiring light button;

when detecting and judging the share light button is clicked on the share page, real-time uploading the control information of all of parts of selected smart lights into a server, after network name information is shared, all related information of lights operation will be acquired from the server corresponding to the network name.

when detecting and judging the acquiring light button is clicked on the share page, acquiring shared network name information, and synchronously acquiring shared control information of smart lights from the server based on the network name information. FIG. 9 is an optional operation flow diagram of a light share authority management.

Figure 4:
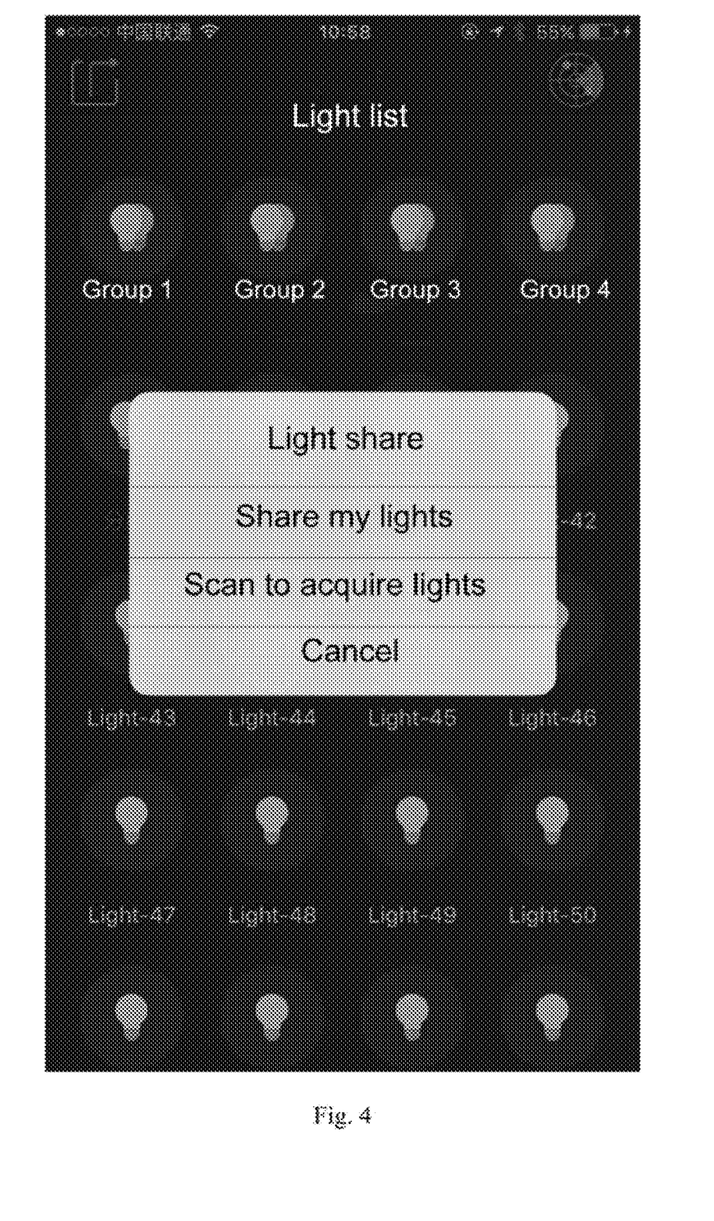
FIG. 4 is an optional embodiment of display after a share button is clicked.

As FIG. 4 shown, users can share group to other mobile phones by scanning a two-dimensional code. Users' operation of light group will upload to a server, when users share single light and/or group in this way, mobile phones scanning a two-dimensional code will read network name information in the two-dimensional code and acquire control information of single light and/or group from the server. And every time main interface of APP is opened, information will be synchronized the first time, such that the control information synchronization of lights in users' different mobile phones can be kept.

As FIG. 4 shown, users can click "share lights" and select "complete sharing", "share light group" or "share lights" to share. Through authority control of share, users can flexibly limit the authority scope that different mobile phones control light group to adapt to application of more occasions. And for "share light group", users can select required group and generate corresponding two-dimensional code; for "share lights", users can select from all searched lights and generate corresponding two-dimensional code. "Complete sharing" means group information of shared mobile phone is completely synchronized with that of mobile phone acquiring sharing, "share light group" means control information of shared single lights or group can be acquired, that is, situation of lights in home can be remote informed, however, new lights cannot be added and group information cannot be edited and changed; "share lights" means shared single lights can be acquired, and also information cannot be edited and changed.

As an optional embodiment, a hover button is preset, if click operation is detected on the hover button, sending full open or full closed switch light configuration information to all single lights and groups; if double click operation is detected on the hover button, displaying the quick control interface; if long press operation is detected on the hover button, locking or unlocking the position of the hover button; under the locking state of the position of the hover button, if sliding operation to a first pre-set direction is detected on the hover button, correspondingly adjusting the color temperature of the connected single light or group; if sliding operation to a second pre-set direction is detected on the hover button, correspondingly adjusting the brightness of the connected single light or group; under the unlocking state of the position of the hover button, if sliding operation is detected on the hover button, the display position of the hover button is changed with the displacement of sliding.

Figure 5:
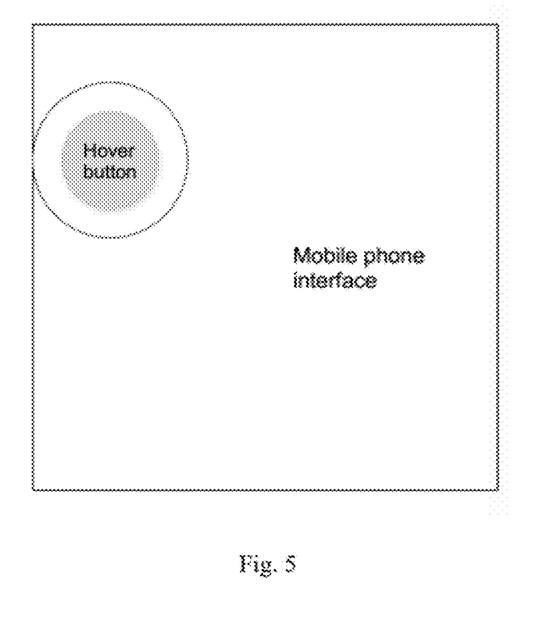
FIG. 5 is an optional embodiment of a hover button display.

As FIG. 5 shown, lights can be controlled by a hover button on the desktop, double clicking the hover button in FIG. 5 will enter into control interface of lights. When activated hover button is clicked, functions such as full open or full closed of all connected smart lights in the same network can be controlled.

The improvements of above embodiments are as follows:

1. Group can be quickly established by dragging single lights, and there is no need to have too much interface selection.

2. The connected single lights or group can be quickly switched by side sliding switch, and there is no need to connect smart lights again.

3. Users can set brightness and color temperature of each single lights or single light members in group by user-defined scene mode, and combined scene can be realized.

4. Information of single lights or group can be shared by scanning two-dimensional code, such that control information of single lights and group can be synchronized in different mobile phones.

5. Through authority control of share, users can flexibly limit the authority scope that different mobile phones control light group to adapt to application of more occasions.

6. Lights can be controlled conveniently by the hover button, and there is no need to enter into APP to directly control the light, which is simple and convenient.

Above disclosure are merely some preferred embodiments of the present invention, it shall be noted that for those skilled in the art various changes or equivalent replacement of these features and embodiment can be made without departing from the spirit and scope of the present invention. Besides, these features and embodiments can be modified without departing from the spirit and scope of the present invention to adapt to specific situation based on the teaching of the present invention. Therefore, the present invention is not limited by the embodiments herein, all embodiments fall into the scope of the claims shall belong to the protection scope of the present invention.

We claim:

1. A lighting method for controlling smart lights, comprising:
    displaying control information of the smart lights as a first kind of icon and/or a second kind of icon on a main interface, the first kind of icon corresponds to a single light and the second kind of icon corresponds to a group consisting of at least two single lights;
    when detecting at the position of the first kind of icon and the second kind of icon and identifying as selected operation, displaying a control interface corresponding to the single light or the group;
    the control interface comprises a light-adjusting tab, the light-adjusting tab comprises a parameter adjustment column, a switch button and an effect simulation diagram;
    when the light-adjusting tab is on active page, sending parameter configuration information to corresponding single light or group based on sliding position of detected slider in the parameter adjustment column, and sending switch light configuration information to corresponding single light or group based on state change of the detected switch button, and displaying the effect simulation diagram based on the parameter configuration information and the switch light configuration information.

2. The lighting method of claim 1, wherein the control interface also comprises a scene tab, the scene tab comprises at least a scene icon, and each scene icon corresponds to a group of pre-set scene parameter;

when the scene tab is on active page, sending the pre-set scene parameter to the single light or group based on detection and identification as selected scene icon, and realizing one-key setting to the single light or the group.

3. The lighting method of claim 2, wherein when displaying the control interface corresponding to the group, the pre-set scene parameter comprises parameter configuration information and switch light configuration information of all single light members contained in the group.

4. The lighting method of claim 2, wherein the scene tab also comprises an add button, when detecting and identifying the add button is pressed, displaying a scene new page;

the scene new page comprises a parameter pre-set option of the single light or the group corresponding to the control interface, generating a group of new pre-set scene parameter based on the input of the parameter pre-set option of the single light or the group in the scene new page, adding a new scene icon in the scene tab, the new scene icon corresponds to the new pre-set scene parameter.

5. The lighting method of claim 1, wherein the parameter configuration information comprises brightness configuration information and/or color temperature configuration information.

6. The lighting method of according to claim 1, wherein the control interface also comprises a setting tab, the setting tab comprises an alarm clock setting and a single light name setting bar;

controlling time on/off of the single light or group based on input time of the alarm clock setting and alarm clock attribution;

displaying input information in the single light name setting bar as name of single light or single light members.

7. The lighting method of claim 1, wherein when detecting and identifying as pre-set gesture operation, displaying a quick control interface, corresponding displaying connected single light and/or group as shrunken first kind of icon and/or second kind of icon on the quick control interface, and when group is provided, displaying single light members contained in the group as the first kind of icon;

when detecting at the position of the first kind of icon and the second kind of icon and identifying as selection on the quick control interface, switching to the control interface corresponding to the single light or the group.

8. The lighting method of claim 7, wherein the pre-set gesture operation is identification information that touch point of pre-set quantities is detected and movement to pre-set direction exceeds pre-set distance.

9. The lighting method of claim 1, wherein on the main interface, if long press is detected at the position of one first kind of icon, and it is dragged to the position of another first kind of icon, it is judged that two corresponding single lights are combined into a group; one second kind of icon is newly established to correspond to a new group, the new group comprises the two single lights.

10. The lighting method of claim 1, wherein on the main interface, if long press is detected at the position of one first kind of icon, and it is dragged to the position of another first kind of icon, it is judged that the single light corresponding to the first kind of icon is added into the group corresponding to the second kind of icon.

11. The lighting method of claim 1, wherein on the main interface, if long press is detected at the position of the second kind of icon, it is judged as group members deletion and group name editing, and displaying a group editing page, the group editing page comprises a group name editing column and single light members displayed as the first kind of icon, displaying a delete icon on the right corner of the first kind of icon corresponding to each single light member, when clicking the delete icon is detected, the corresponding single light member is deleted from the group; and saving the information of the group name editing column as name of the group.

12. The lighting method of claim 1, wherein the main interface also comprises a share button, when detecting and judging the share button is clicked on the main interface, displaying a share page, the share page comprises a share light button and an acquiring light button;

when detecting and judging the share light button is clicked on the share page, real-time uploading the control information of all of parts of selected smart lights into a server;

when detecting and judging the acquiring light button is clicked on the share page, acquiring shared network name information, and synchronously acquiring shared control information of smart lights from the server based on the network name information.

13. The lighting method of claim 7, wherein a hover button is preset, if click operation is detected on the hover button, sending full open or full closed switch light configuration information to all single lights and groups;

if double click operation is detected on the hover button, displaying the quick control interface;

if long press operation is detected on the hover button, locking or unlocking the position of the hover button;

under the locking state of the position of the hover button, if sliding operation to a first pre-set direction is detected on the hover button, correspondingly adjusting the color temperature of the connected single light or group; if sliding operation to a second pre-set direction is detected on the hover button, correspondingly adjusting the brightness of the connected single light or group;

under the unlocking state of the position of the hover button, if sliding operation is detected on the hover button, the display position of the hover button is changed with the displacement of sliding.

* * * * *